United States Patent
Kawakita et al.

(10) Patent No.: US 10,005,153 B2
(45) Date of Patent: Jun. 26, 2018

(54) LASER BEAM WELDING APPARATUS AND LASER BEAM WELDING METHOD

(71) Applicant: TOYOTA JIDOSHA KABUSHIKI KAISHA, Toyota-shi, Aichi (JP)

(72) Inventors: Atsushi Kawakita, Miyoshi (JP); Shuhei Ogura, Nagakute (JP); Yuta Iwamoto, Toyota (JP); Hiroaki Kishi, Nagoya (JP); Nobuhiro Iijima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 14/660,178

(22) Filed: Mar. 17, 2015

(65) Prior Publication Data
US 2015/0266132 A1    Sep. 24, 2015

(30) Foreign Application Priority Data
Mar. 20, 2014    (JP) .................. 2014-059233

(51) Int. Cl.
| B23K 26/00 | (2014.01) |
| B23K 26/06 | (2014.01) |
| B23K 26/08 | (2014.01) |
| B23K 26/10 | (2006.01) |
| B23K 26/03 | (2006.01) |
| B23K 26/24 | (2014.01) |
| B23K 26/22 | (2006.01) |

(52) U.S. Cl.
CPC ............ B23K 26/032 (2013.01); B23K 26/22 (2013.01); B23K 26/24 (2013.01)

(58) Field of Classification Search
CPC ...... B23K 26/032; B23K 26/22; B23K 26/24; B23K 26/03; B23K 26/06; B23K 26/0643; B23K 26/00; B23K 26/08; B23K 26/10

USPC ............ 219/121.64, 121.61, 121.63, 121.73, 219/121.74, 121.76, 121.77, 121.8, 219/121.85

See application file for complete search history.

(56) References Cited

U.S. PATENT DOCUMENTS

| 5,256,852 A | 10/1993 | Boudot |
| 5,698,120 A | 12/1997 | Kurosawa et al. |

FOREIGN PATENT DOCUMENTS

| CN | 1060424 A | 4/1992 |
| CN | 1136487 A | 11/1996 |
| JP | 2000-042769 A | 2/2000 |
| JP | 2000-153379 A | 6/2000 |
| JP | 3227650 B2 | 11/2001 |

(Continued)

Primary Examiner — Michael G Hoang
(74) Attorney, Agent, or Firm — Oliff PLC

(57) ABSTRACT

Provided is a laser beam welding apparatus capable of correctly detecting the beginning and the end of one welding point even in remote laser beam welding. The laser beam welding apparatus includes a head which irradiates a workpiece with a laser beam, an optical receiver which receives a reflected light of the laser beam from the workpiece, and a controller. The optical receiver receives only a laser beam and a plasma of the reflected light. The controller determines that one welding point begins when a time during which intensity of the reflected light is larger than or equal to a second set-intensity is longer than or equal to a first set-time, and determines that the one welding point ends when a time during which the intensity of the reflected light is smaller than or equal to a first set-intensity is longer than or equal to a second set-time.

2 Claims, 3 Drawing Sheets

(56) References Cited

FOREIGN PATENT DOCUMENTS

| | | | |
|---|---|---|---|
| JP | 2003-340585 | A | 12/2003 |
| JP | 2004-330292 | A | 11/2004 |
| JP | 2010-201489 | A | 9/2010 |
| JP | 2011-167697 | A | 9/2011 |

LASER BEAM WELDING APPARATUS AND LASER BEAM WELDING METHOD

TECHNICAL FIELD

The present invention relates to a technique for a laser beam welding apparatus and a laser beam welding method.

BACKGROUND ART

Laser beam welding is a technique for irradiating a workpiece (for example, two steel plates) with a laser beam to locally melt and solidify the workpiece, thereby joining the workpiece. In the laser beam welding apparatus, for example, a welding point is checked as a laser beam welding inspection based on a reflected light from a welded portion of the workpiece (for example, see JP-A 2011-167697).

Recently, in welding of vehicle body, remote laser beam welding is performed even in spot welding. The remote laser beam welding is a technique for scanning a portion to be welded with a long-focus laser beam using a mirror to weld the portion.

In the remote laser beam welding, multi-step laser beam irradiation such as irradiation of a laser beam for welding and irradiation of a laser beam for inspection is performed in one welding point (a step for welding one spot). Therefore, the beginning and the end of the one welding point are hardly detected based on only turning on/off of irradiation of a laser beam.

SUMMARY OF INVENTION

Problem to Be Solved By the Invention

An object of the present invention is to provide a laser beam welding apparatus and a laser beam welding method capable of correctly detecting the beginning and the end of one welding point even in remote laser beam welding.

Means for Solving the Problem

The problem to be solved by the present invention is described above, and means for solving the problem will be described below.

A first aspect of the present invention is a laser beam welding apparatus including a head which irradiates a workpiece with a laser beam, an optical system which focuses the laser beam to scan the workpiece with the laser beam, an optical receiver which receives a reflected light of the laser beam from the workpiece, and a controller which determines the beginning and the end of one welding point based on the reflected light received by the optical receiver. The optical receiver receives only a laser beam and a plasma of the reflected light. The controller determines that the one welding point begins when a time during which intensity of the reflected light is larger than or equal to a second set-intensity is longer than or equal to a first set-time, and determines that the one welding point ends when a time during which the intensity of the reflected light is smaller than or equal to a first set-intensity is longer than or equal to a second set-time.

A second aspect of the present invention is a laser beam welding method including a first step for irradiating a workpiece with a laser beam, a second step for receiving a reflected light of the laser beam from the workpiece, and a third step for determining the beginning and the end of one welding point based on the received reflected light. The second step includes receiving only a laser beam and a plasma of the reflected light. The third step includes determining that the one welding point begins when a time during which intensity of the reflected light is larger than or equal to a second set-intensity is longer than or equal to a first set-time, and determining that the one welding point ends when a time during which the intensity of the reflected light is smaller than or equal to a first set-intensity is longer than or equal to a second set-time.

Effects of the Invention

The laser beam welding apparatus and the laser beam welding method according to the present invention make it possible to correctly detect the beginning and the end of one welding point even in remote laser beam welding.

DESCRIPTION OF EMBODIMENTS

Figure 1:
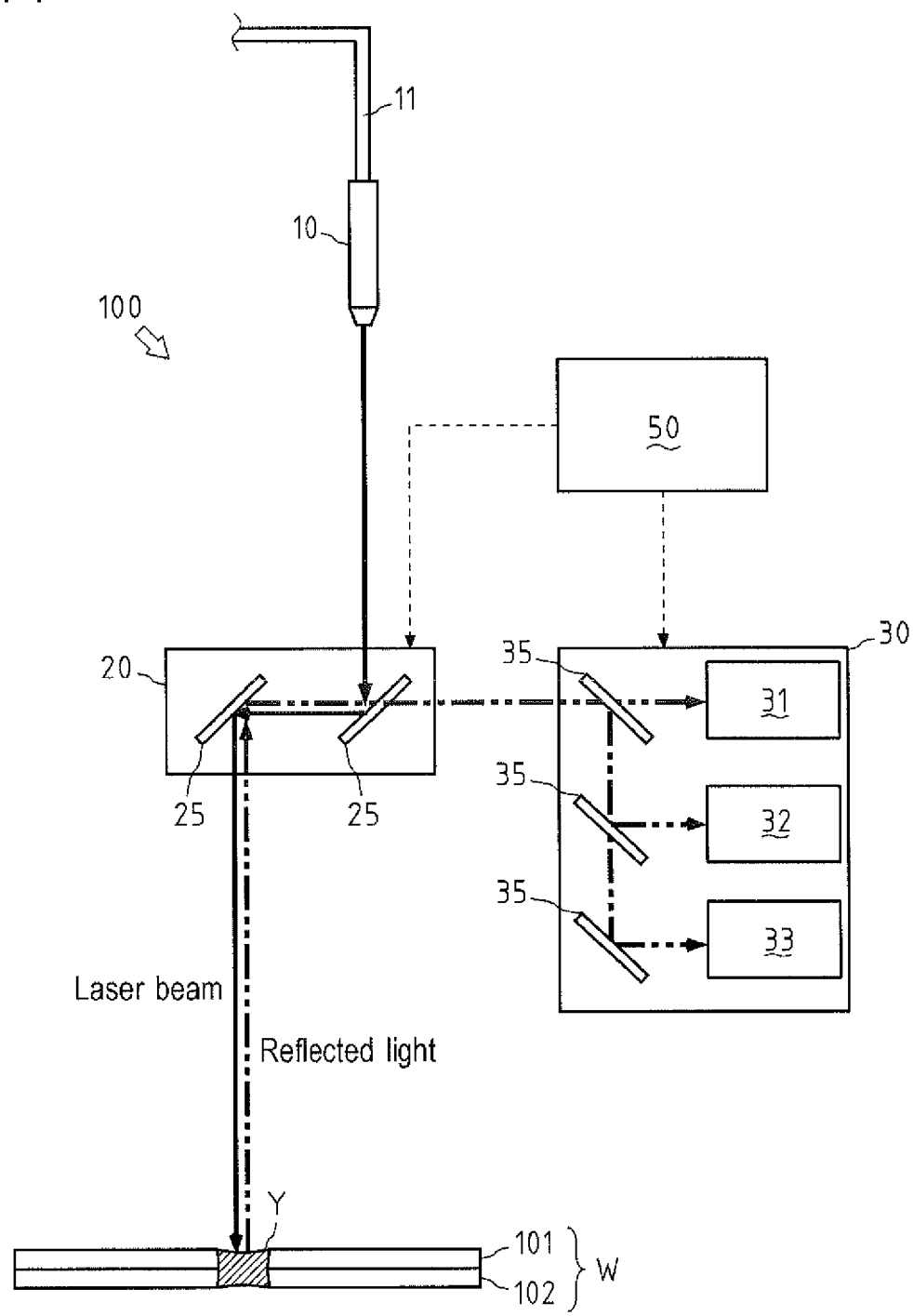
FIG. 1 is a schematic diagram illustrating a configuration of a laser beam welding apparatus.

A configuration of a laser beam welding apparatus 100 will be described with reference to FIG. 1. FIG. 1 schematically illustrates the configuration of the laser beam welding apparatus 100. Further, in FIG. 1, for convenience, an applied laser beam is indicated by a solid line, a reflected light is indicated by an alternate long and two short dashes line, and an electric signal line is indicated by a broken line.

The laser beam welding apparatus 100 is a laser beam welding apparatus according to an embodiment of the present invention. The laser beam welding apparatus 100 irradiates a workpiece W with a laser beam to locally melt and solidify the workpiece W, thereby joining the workpiece W. In the embodiment, the workpiece W is formed by placing two steel plates 101 and 102 one on top of the other. The laser beam welding apparatus 100 irradiates the workpiece W with a laser beam for welding, and thereby a welded portion Y is formed.

The laser beam welding apparatus 100 includes a head 10, an optical system 20, an optical receiver 30, and a controller 50.

The head 10 is oscillated by a laser oscillator (not illustrated), and irradiates the workpiece W with the laser beam guided by an optical path 11. In the optical path 11, the laser beam is folded by a mirror and transmitted, or the laser beam is freely curved by an optical fiber and transmitted.

The optical system 20 includes a plurality of mirrors 25 and 25. In the optical system 20, by adjusting the mirrors 25 and 25, the laser beam output from the head 10 is focused on the workpiece W with a proper size, and the workpiece W is scanned with the laser beam.

The optical receiver 30 receives the reflected light from the welded portion Y of a laser beam for inspection. The optical receiver 30 includes a plurality of mirrors 35, a laser beam receiver 31, a plasma receiver 32, and an infrared receiver 33.

The laser beam itself (having a wavelength around 1060 nm) that is not absorbed by the welded portion Y is folded by the mirror 35, and received by the laser beam receiver 31.

Plasma (having a wavelength of 1100 nm or more) generated by metallic vaporization from a keyhole (a recess of the welded portion Y) is folded by the mirror 35, and received by the plasma receiver 32.

An infrared beam (having a wavelength of 600 nm or less) generated by radiation of molten metal heat of the welded portion Y is folded by the mirror 35, and received by the infrared receiver 33.

The controller 50 is connected to the optical system 20 and the optical receiver 30. The controller 50 has a function of controlling the optical system 20. The controller 50 also has a function of determining the beginning and the end of one welding point (a step for welding one spot) based on intensity of the reflected light received by the optical receiver 30.

It is notable that the controller 50 of the embodiment determines the beginning and the end of laser beam irradiation based on the intensity of only the laser beam received by the laser beam receiver 31 of the optical receiver 30 and the plasma received by the plasma receiver 32 of the optical receiver 30.

A flow of a laser beam welding step S100 will be described with reference to FIG. 2.

Figure 2:
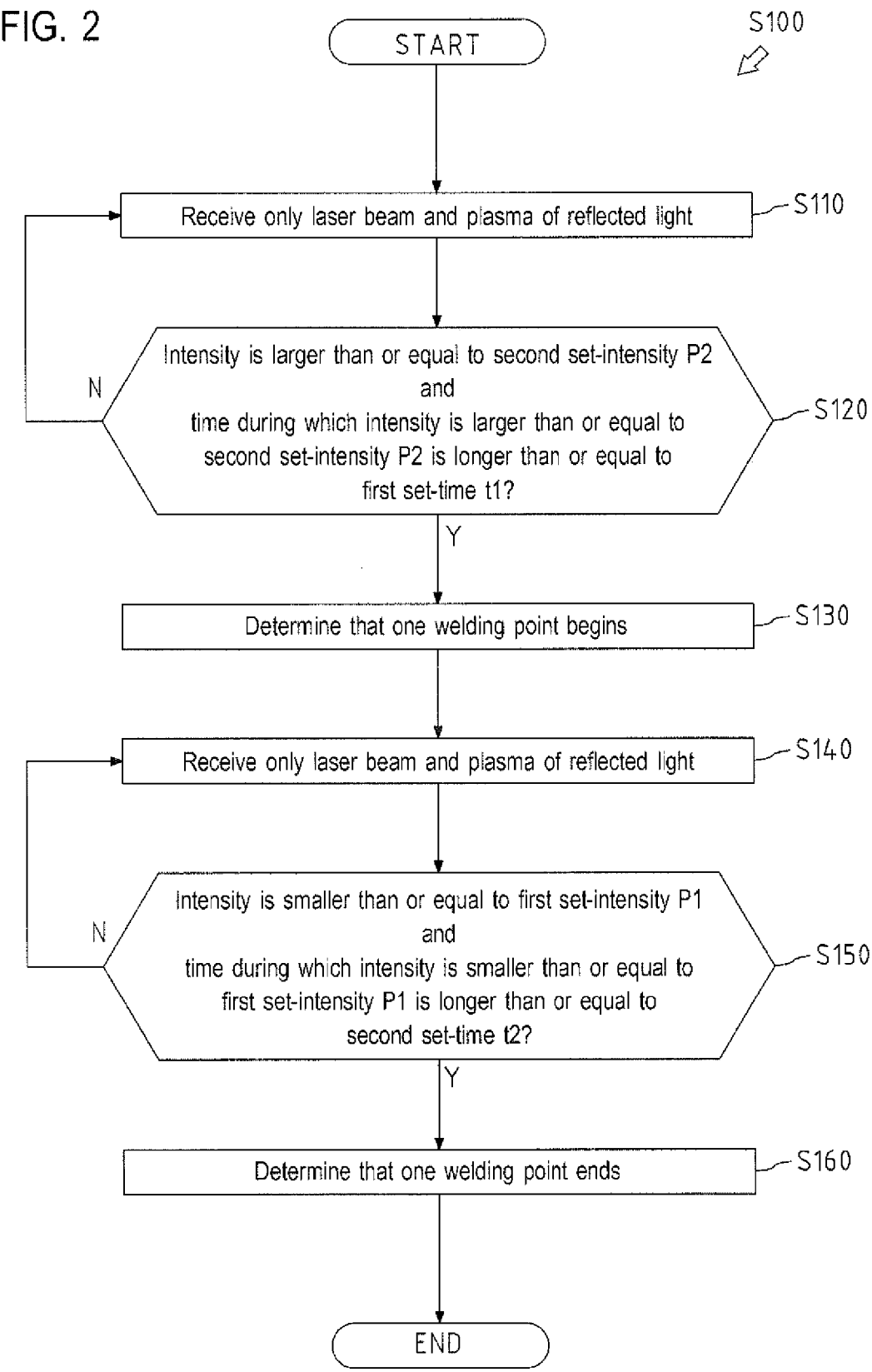
FIG. 2 is a flowchart illustrating a flow of a laser beam welding step.

FIG. 2 is a flowchart showing the flow of the laser beam welding step S100.

The laser beam welding step S100 is a laser beam welding method of the embodiment of the present invention. The laser beam welding step S100 is a step for checking the welding point at which the beginning and the end of the one welding point are determined by using the reflected light from the welded portion Y of the workpiece W.

In Step S110, the controller 50 receives only the laser beam received by the laser beam receiver 31 and the plasma received by the plasma receiver 32 using the optical receiver 30, and acquires only the laser beam and the plasma.

In Step S120, the controller 50 determines whether a condition where the intensity of the acquired laser and plasma is larger than or equal to a second set-intensity P2 is satisfied, and determines whether a condition where a time during which the intensity is larger than or equal to the second set-intensity P2 is longer than or equal to a first set-time t1 is satisfied (condition 1). That is, the controller 50 determines whether the intensity of the acquired laser beam and plasma is continuously larger than or equal to the second set-intensity P2 for the time which is longer than or equal to the first set-time t1. The controller 50 proceeds to Step S130 when the "condition 1" is satisfied, and the controller 50 proceeds to Step S110 when the "condition 1" is not satisfied.

In Step S130, the controller 50 determines that the one welding point begins.

In Step S140, the controller 50 ongoingly receives only the laser beam received by the laser beam receiver 31 and the plasma received by the plasma receiver 32 using the optical receiver 30, and acquires only the laser beam and the plasma.

In Step S150, the controller 50 determines whether a condition where the intensity of the acquired laser beam and plasma is smaller than or equal to a first set-intensity P1 is satisfied, and determines whether a condition where a time during which the intensity is smaller than or equal to the first set-intensity P1 is longer than or equal to a second set-time t2 is satisfied (condition 2). That is, the controller 50 determines whether the intensity of the acquired laser beam and plasma is continuously smaller than or equal to the first set-intensity P1 for the time which is longer than or equal to the second set-time t2. The controller 50 proceeds to Step S160 when the "condition 2" is satisfied, and the controller 50 proceeds to Step S140 when the "condition 2" is not satisfied.

In Step S160, the controller 50 determines that the one welding point ends.

Action of the laser beam welding step S100 will be described with reference to FIG. 3.

Figure 3:
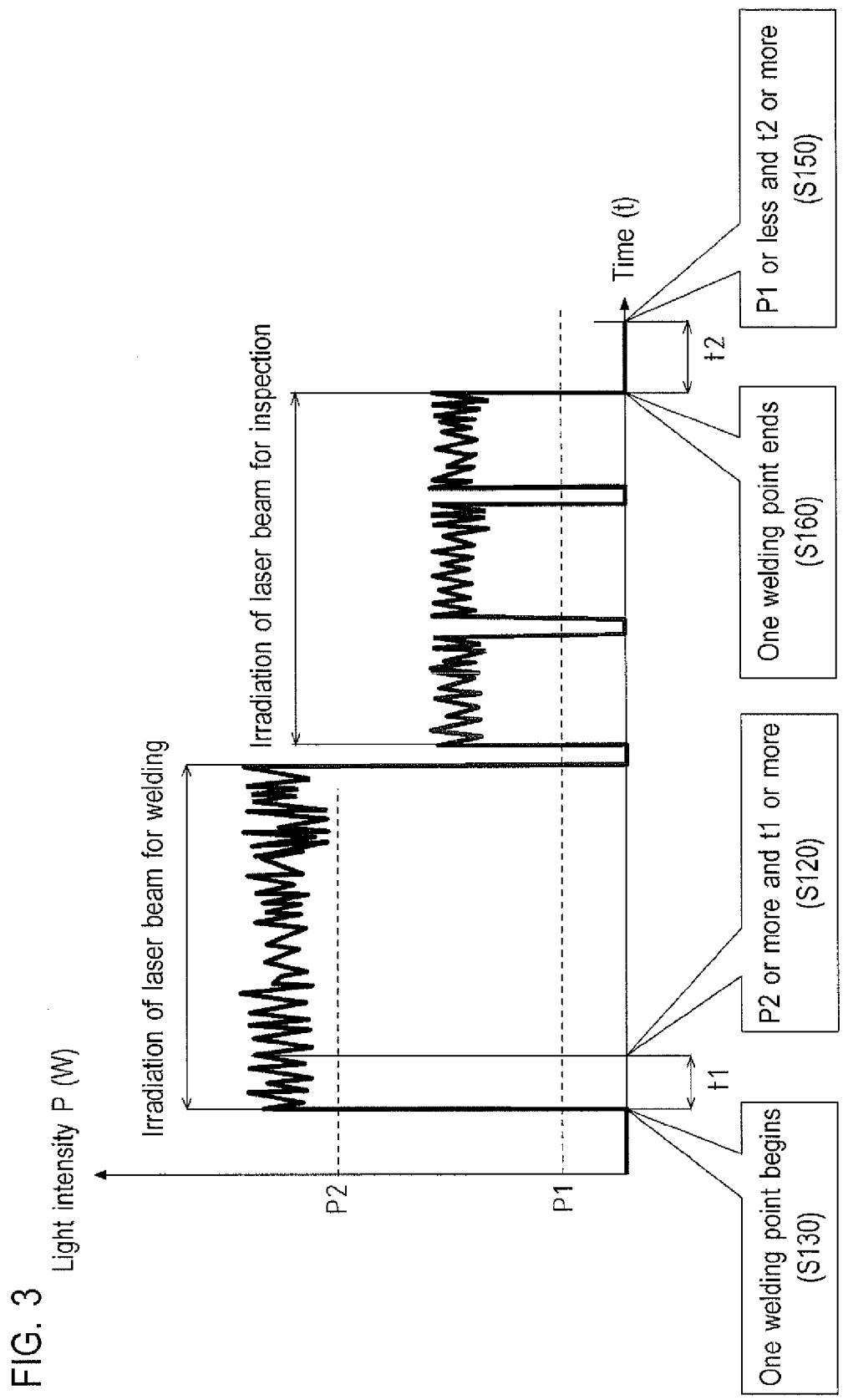
FIG. 3 is a graph illustrating action of the laser beam welding step.

In FIG. 3, the action of the laser beam welding step S100 is indicated by a time-series graph showing a light intensity P (unit: W) of the reflected light in the one welding point.

In the laser beam welding step S100 of the embodiment, firstly the workpiece W is irradiated with the laser beam for welding, then the laser beam for inspection goes around a circular scanning locus only three times in the formed welded portion Y, and whether a welding defect of the welded portion Y exists is determined by a time-periodical change of the intensity of the reflected light.

Thus, the laser beam welding step S100 in the one welding point includes the step for irradiating the workpiece W with the laser beam for welding and the step for irradiating the workpiece W with the laser beam for inspection after the irradiation of the laser beam for welding.

First, the workpiece W is irradiated with the laser beam for welding (the beginning of the one welding point). The intensity of the laser beam for welding is sufficiently larger than the second set-intensity P2. As described above, the controller 50 acquires only the laser beam and plasma.

The intensity of the acquired laser beam and plasma increases from the beginning of the one welding point. When the first set-time t1 elapses from a time point at which the intensity becomes larger than or equal to the second set-intensity P2 (Step S120), the controller 50 determines that the condition (condition 1) where the time during which the intensity is larger than or equal to the second set-intensity P2 is longer than or equal to the first set-time t1 is satisfied.

The controller 50 determines that the time point before the first set-time t1 from the time point at which the "condition 1" is satisfied is the beginning of the one welding point (Step S130).

Next, the laser beam for inspection goes around the circular scanning locus three times in the welded portion Y of the workpiece W. The intensity of the laser beam for inspection is sufficiently smaller than the second set-intensity P2 and sufficiently larger than the first set-intensity P1.

When the second set-time t2 elapses from the time point at which the intensity of the acquired laser beam and plasma becomes smaller than or equal to the first set-intensity P1, the controller 50 determines that the condition (condition 2) where the time during which the intensity is smaller than or equal to the first set-intensity P1 is longer than or equal to the second set-time t2 is satisfied (Step S150).

The controller 50 determines that the time point before the second set-time t2 from the time point at which the "condition 2" is satisfied is the end of the one welding point (Step S160).

Effects of the laser beam welding apparatus 100 and the laser beam welding step S100 will be described below.

According to the laser beam welding apparatus 100 and the laser beam welding step S100, the beginning and the end of the one welding point can correctly be detected even in the remote laser beam welding.

That is, in the laser beam welding apparatus 100 and the laser beam welding step S100, the beginning and the end of the one welding point can correctly be detected even in the complicated reflected light of the remote laser beam welding by providing detection thresholds and times of the beginning and the end of the one welding point.

Additionally, in the laser beam welding apparatus 100 and the laser beam welding step S100, by acquiring the laser beam and the plasma, a waveform having excellent responsiveness is obtained, and the times of the beginning and the end of the one welding point can be set shorter.

REFERENCE SIGNS LIST

10: head
20: optical system
30: optical receiver
50: controller
100: laser beam welding apparatus
P: light intensity
P1: first set-intensity
P2: second set-intensity
t1: first set-time
t2: second set-time

What is claimed is:

1. A laser beam welding apparatus comprising:
   a head which irradiates one welding point in a workpiece with a laser beam;
   an optical system which focuses the laser beam to scan the workpiece with the laser beam;
   an optical receiver which receives a reflected light of the laser beam from the workpiece,
   wherein the optical receiver receives only a laser beam and a plasma of the reflected light; and
   a controller which determines the beginning and the end of the one welding point based on the reflected light received by the optical receiver, wherein
   in the one welding point, the head irradiates the workpiece with a laser beam for welding, an intensity of the laser beam for welding being greater than a first set-intensity and a second set-intensity;
   after a welded portion in the one welding point is formed by the laser beam for welding, the head irradiates the workpiece with a laser beam for inspection, an intensity of the laser beam for inspection being less than the second set-intensity and greater than the first set-intensity,
   wherein the head irradiates the laser beam for inspection around a circular scanning locus of the welded portion in the one welding point;
   when an intensity of the reflected light is greater than or equal to the second set-intensity for an amount of time that is greater than or equal to a first set-time, the controller determines that the one welding point begins; and
   when the intensity of the reflected light is less than or equal to the first set-intensity for an amount of time that is greater than or equal to a second set-time, the controller determines that the one welding point ends.

2. A laser beam welding method, comprising:
   irradiating one welding point in a workpiece with a laser beam;
   receiving a reflected light of the laser beam from the workpiece,
   wherein only a laser beam of the reflected light and a plasma of the reflected light are received;
   determining the beginning and the end of the one welding point based on the received reflected light;
   in the one welding point, irradiating the workpiece with a laser beam for welding, an intensity of the laser beam for welding being greater than a first set-intensity and a second set-intensity;
   after a welded portion in the one welding point is formed by the laser beam for welding, irradiating the workpiece with a laser beam for inspection, an intensity of the laser beam for inspection being less than the second set-intensity and greater than the first set-intensity,
   wherein the laser beam for inspection is irradiated around a circular scanning locus of the welded portion in the one welding point;
   when an intensity of the reflected light is greater than or equal to the second set-intensity for an amount of time that is greater than or equal to a first set-time, determining that the one welding point begins; and
   when the intensity of the reflected light is less than or equal to the first set-intensity for an amount of time that is greater than or equal to a second set-time, determining that the one welding point ends.

* * * * *